US011949985B2

(12) United States Patent
Park et al.

(10) Patent No.: US 11,949,985 B2
(45) Date of Patent: Apr. 2, 2024

(54) ELECTRONIC DEVICE INCLUDING MULTIPLE CAMERAS AND METHOD OF CONTROLLING ELECTRONIC DEVICE

(71) Applicant: Samsung Electronics Co., Ltd., Gyeonggi-do (KR)

(72) Inventors: Jungsik Park, Gyeonggi-do (KR); Jungho Lee, Gyeonggi-do (KR); Wonjoon Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/871,367

(22) Filed: Jul. 22, 2022

(65) Prior Publication Data
US 2022/0360710 A1    Nov. 10, 2022

Related U.S. Application Data

(63) Continuation of application No. PCT/KR2021/017464, filed on Nov. 25, 2021.

(30) Foreign Application Priority Data

Nov. 25, 2020  (KR) .......................... 10-2020-0160426

(51) Int. Cl.
*H04N 23/667* (2023.01)
*H04N 23/63* (2023.01)
(Continued)

(52) U.S. Cl.
CPC ......... *H04N 23/667* (2023.01); *H04N 23/631* (2023.01); *H04N 23/69* (2023.01); *H04N 23/695* (2023.01); *H04N 23/90* (2023.01)

(58) Field of Classification Search
CPC .... H04N 23/667; H04N 23/631; H04N 23/69; H04N 23/695; H04N 23/90; H04N 23/00;
(Continued)

(56) References Cited

U.S. PATENT DOCUMENTS 9,930,223 B2   3/2018  Park et al.
10,701,256 B2  6/2020  Zhou et al.
(Continued)

FOREIGN PATENT DOCUMENTS

JP   2005-101874 A   4/2005
KR   1998-051325 A   9/1998
(Continued)

OTHER PUBLICATIONS

European Search Report dated Dec. 15, 2023.

*Primary Examiner* — Christopher K Peterson
(74) *Attorney, Agent, or Firm* — Cha & Reiter, LLC

(57) ABSTRACT

An electronic device and method are disclosed. The electronic device includes a display, a camera module having first and second cameras having first and second viewing angles, respectively, and a processor. The processor implements the method, including: acquiring a first image with a first magnification using the first camera, and displaying the first image on the display, while acquiring the first image, receiving an input requesting changing an image acquisition magnification of the camera module from the first magnification to a second magnification, changing a distance between the first camera and the second camera in response to the input, upon detecting that the changed distance between the first camera and the second camera is less than or equal to a threshold distance, switching from the first camera to the second camera, and acquiring a second image using the second camera, and display the acquired second image on the display.

18 Claims, 13 Drawing Sheets

(51) Int. Cl.
*H04N 23/69* (2023.01)
*H04N 23/695* (2023.01)
*H04N 23/90* (2023.01)

(58) Field of Classification Search
CPC .... H04N 23/57; H04N 23/687; H04N 23/698; H04N 23/54; H04N 5/257; H04N 23/60; H04N 23/951; H04N 23/632; G06T 7/80
See application file for complete search history.

(56) References Cited

U.S. PATENT DOCUMENTS

| | | |
|---|---|---|
| 10,917,586 B2 | 2/2021 | Kim |
| 10,951,833 B2 | 3/2021 | Yuan |
| 11,044,408 B2 | 6/2021 | Guo et al. |
| 2013/0182150 A1 | 7/2013 | Asakura |
| 2016/0366394 A1 | 12/2016 | Park et al. |
| 2017/0094183 A1 | 3/2017 | Miller et al. |
| 2017/0230585 A1 | 8/2017 | Nash et al. |
| 2018/0376122 A1 | 12/2018 | Park et al. |
| 2019/0068886 A1* | 2/2019 | Baek .................. H04N 23/69 |
| 2019/0236765 A1 | 8/2019 | Yeo et al. |
| 2020/0099856 A1* | 3/2020 | Yun .................. G11B 27/031 |

FOREIGN PATENT DOCUMENTS

| | | |
|---|---|---|
| KR | 2003-0037313 A | 5/2003 |
| KR | 10-2018-0109918 A | 10/2018 |
| KR | 10-2019-0021725 A | 3/2019 |

\* cited by examiner

ELECTRONIC DEVICE INCLUDING MULTIPLE CAMERAS AND METHOD OF CONTROLLING ELECTRONIC DEVICE

CROSS-REFERENCE TO RELATED APPLICATION(S)

This application is a continuation of International Application No. PCT/KR2021/017464 filed on Nov. 25, 2021, which claims priority to Korean Patent Application No. 10-2020-0160426 filed on Nov. 25, 2020 in the Korean Intellectual Property Office, the disclosures of which are herein incorporated by reference.

TECHNICAL FIELD

Certain embodiments of the disclosure relate to parallax correction depending on switching of cameras each having a different angle of view in an electronic device including the plurality of cameras.

BACKGROUND ART

Portable electronic devices may sometimes include a plurality of cameras each having a different angle-of-view ranges to provide a user with images of various angles of view. Each of the cameras may be disposed in a slightly different physical location according to design of the electronic device. Accordingly, when a camera is switched to acquire an image having a different angle of view, parallax error may occur due to the difference in the physical location of each camera.

A conventional corrective technique involves cropping each of the images having different viewing angles, which may be aided by activating all equipped cameras to detect and correct the parallax error caused by camera switching. In addition, another conventional corrective technique involves switching from the camera having a particular magnification to another camera having a different angle of view, to correct a parallax error encountered in a zoom operation of the camera.

According to the latter conventional corrective technique, when switching the camera with the specific magnification of the zoom operation to correct the parallax error, camera shake may occur, in which case parallax cannot be corrected because of the activation of Optical Image Stabilization (OIS)/Auto Focus (AF). The result may be a mismatch in image such as occurrence of stuttering in a captured image.

According to the former conventional corrective technique, as all cameras are activated to crop the images having different angles of view, current consumption and processor load may be increased.

SUMMARY

An electronic device according to an embodiment of the disclosure is provided. The electronic device includes a display, a camera module including a first camera having a first angle of view and a second camera having a second angle of view different from the first angle of view, and a processor operatively coupled to the display and the camera module. The processor may be configured to acquire a first image with a first magnification using the first camera, and display the acquired first image on the display, while acquiring the first image using the first camera, receive an input for changing an image acquisition magnification of the camera module from the first magnification to a second magnification, change a distance between the first camera and the second camera in response to the input, upon identifying that the distance between the first camera and the second camera is less than or equal to a threshold distance, switch from the first camera to the second camera, and acquire a second image using the second camera and display the acquired second image on the display.

A method of operating an electronic device according to an embodiment of the disclosure is provided. The method includes acquiring a first image with a first magnification using a first camera having a first angle of view and displaying the acquired first image on a display, while acquiring the first image using the first camera, receiving an input for changing an image acquisition magnification of a camera module from the first magnification to a second magnification, changing a distance between the first camera and a second camera having a second angle of view different from the first angle of view in response to the input, upon detecting that the changed distance between the first camera and the second camera is less than or equal to a threshold distance, switching from the first camera to the second camera, and acquiring a second image using the second camera and display the acquired second image on the display.

According to certain embodiments of the disclosure, even if Optical Image Stabilization (OIS)/Auto Focus (AF) is activated according to detection of camera shake when switching the active camera, parallax caused by switching can nonetheless be corrected, thereby reducing image mismatch errors.

According to certain embodiments of the disclosure, it is possible to reduce activation of all equipped cameras, thereby reducing processor load and current consumption.

Advantageous effects that can be obtained in the disclosure are not limited to the aforementioned advantageous effects, and other unmentioned advantageous effects can be clearly understood by one of ordinary skill in the art to which the disclosure pertains from the description below.

DETAILED DESCRIPTION

Figure 1:
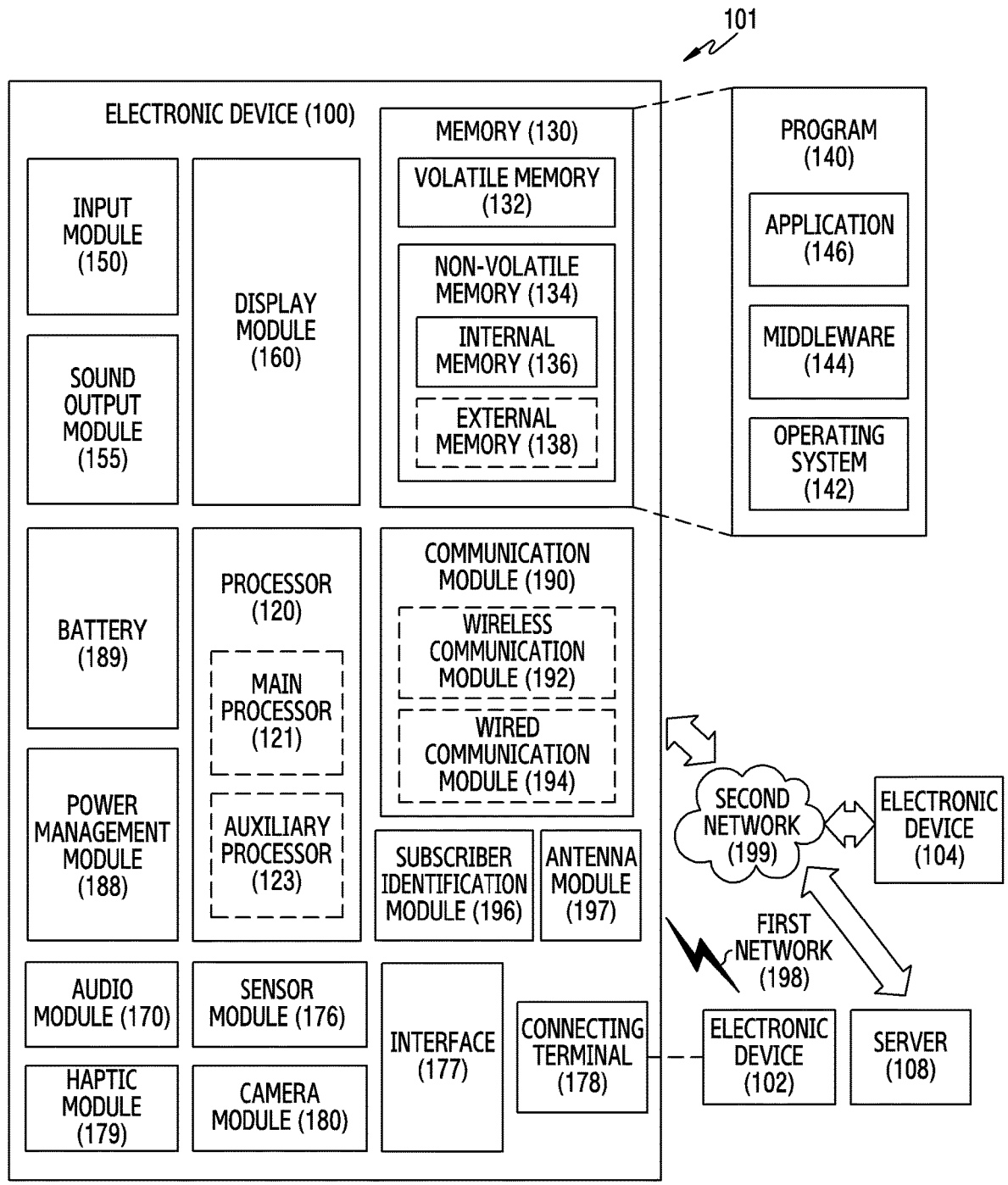
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related therertto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
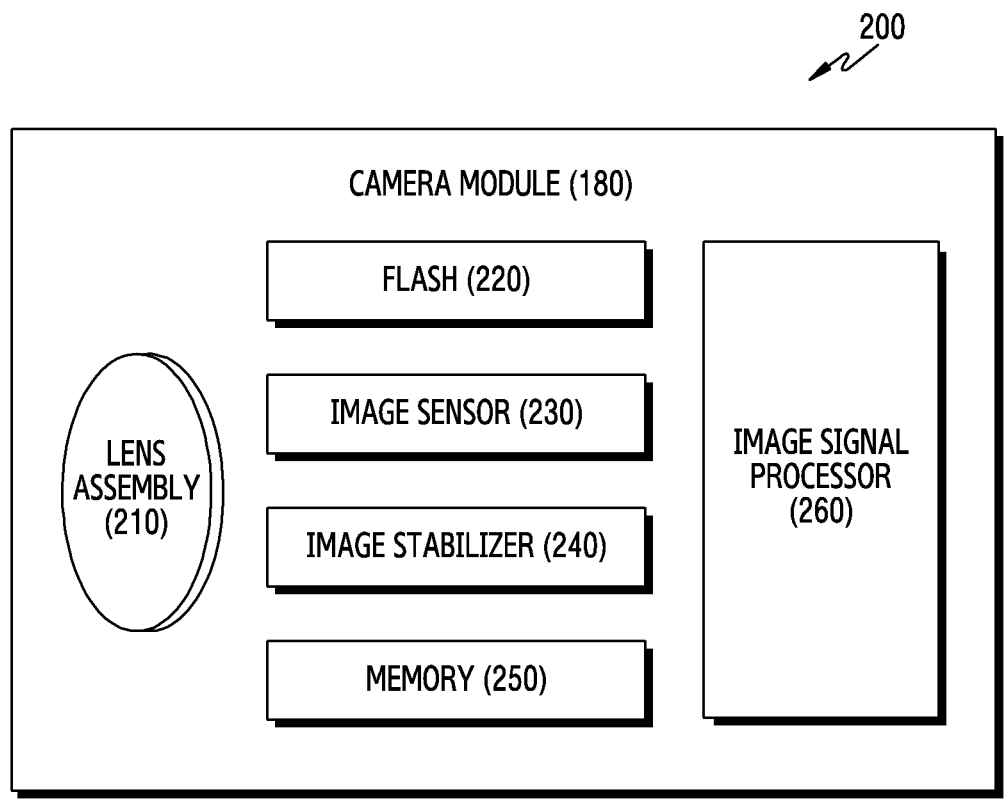
FIG. 2 is a block diagram illustrating a camera module, according to certain embodiments.

FIG. 2 is a block diagram 200 illustrating the example camera module 180 according to certain embodiments. Referring to FIG. 2, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to detected movement of the camera module 180 or the electronic device 101 including the camera module 180. This may compensate for at least part of a negative effect (e.g., image blurring) caused by the movement while an image is being captured. According to an embodiment, the image stabilizer 240 may detect such a movement by the camera module 180 or the electronic device 101 using a gyroscopic sensor (not shown) or an acceleration sensor (not shown) disposed inside or outside the camera module 180. According to an embodiment, the image stabilizer 240 may be implemented, for example, as an optical image stabilizer (OIS).

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing operations with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In some embodiments, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
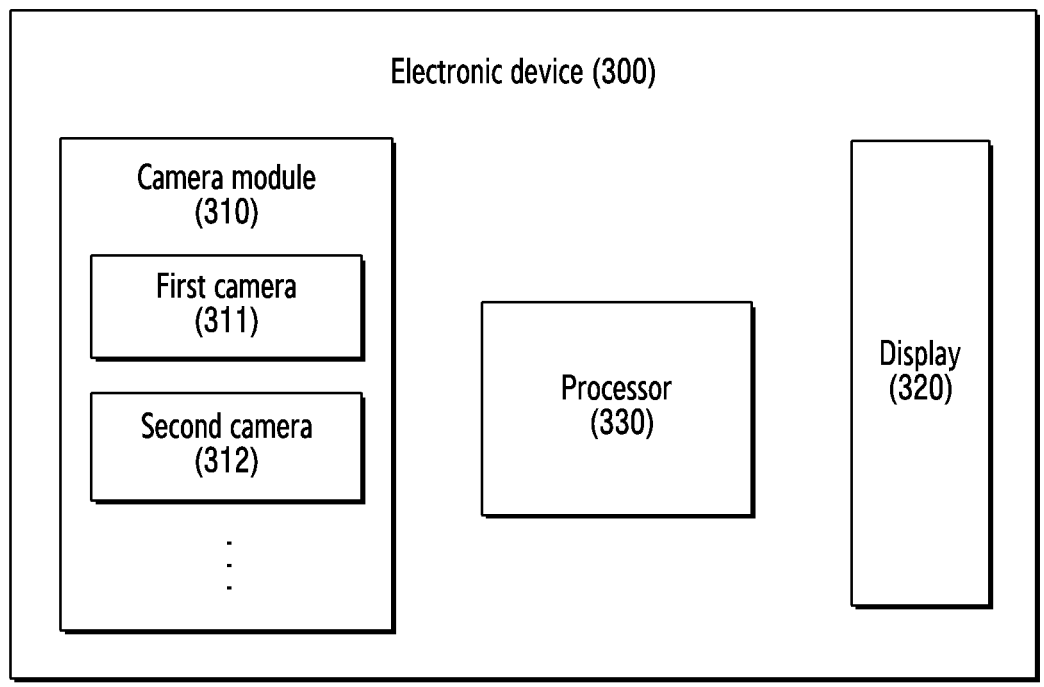
FIG. 3 briefly illustrates a structure of an electronic device including a plurality of cameras, according to an embodiment.

FIG. 3 briefly illustrates an example structure of an electronic device including a plurality of cameras, according to an embodiment.

According to an embodiment, an electronic device 300 may correspond to the electronic device 101 of FIG. 1. For example, the electronic device 300 may include components included in the electronic device 101 of FIG. 1, and may include additional component other than the components of FIG. 3. Alternatively, at least one of the components of FIG. 3 may be omitted.

According to an embodiment, the electronic device 300 may include at least one of a camera module 310, a display 320, and a processor 330.

In an embodiment, the camera module 310 may include a plurality of cameras. For example, as shown in FIG. 3, the camera module 310 may include a first camera 311 and a second camera 312. As another example, the camera module 310 may further include a camera (e.g., a camera module 313 of FIG. 4) other than the first camera 311 and the second camera 312. An angle-of-view range of each camera included in the camera module 310 may be different from one camera to another.

In an embodiment, the display 320 may display an image acquired using the camera module 310. For example, the display 320 may display an image acquired by using the first camera 311 included in the camera module 310, and the display 320 may display an image acquired by using the second camera 312 included in the camera module 310. As another example, the display 320 may display an image acquired by using a camera (e.g., the third camera 313 of FIG. 4) other than the first camera 311 and the second camera 312.

In an embodiment, the processor 330 may control the camera module 310 and the display 320. For example, the electronic device 300 may acquire an image using the camera module 310 under the control of the processor 330. Specifically, for example, the electronic device 300 may acquire an image controlling the first camera 311 and second camera 312 included in the camera module 310 under the control of the processor 330. In addition, the electronic device 300 may display the image, which is acquired under the control of the processor 330, on the display 320.

Figure 4:
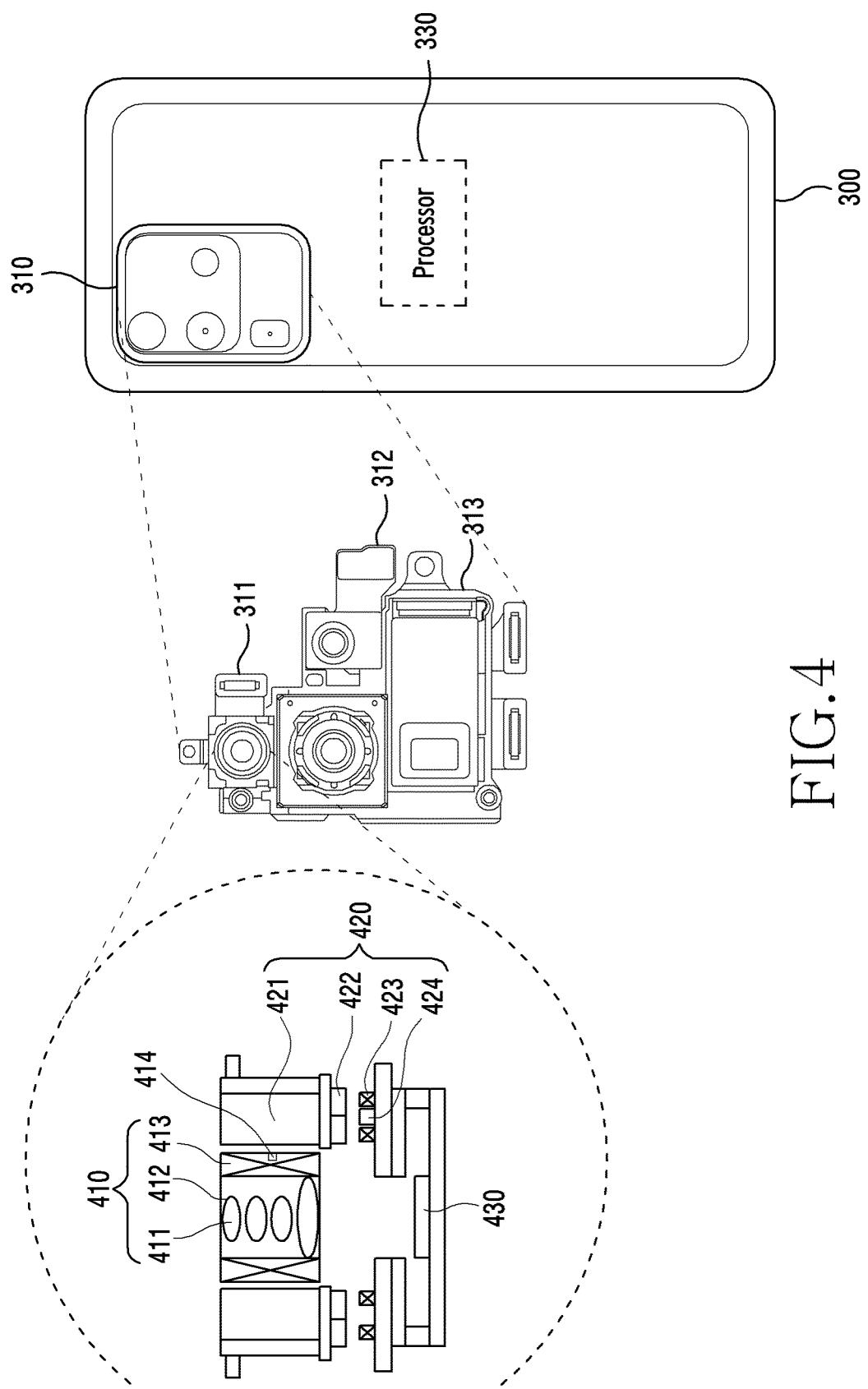
FIG. 4 illustrates a structure of a plurality of cameras included in an electronic device, according to an embodiment.

FIG. 4 illustrates an example structure of a plurality of cameras included in an electronic device, according to an embodiment.

According to an embodiment, a camera module 310 of an electronic device 300 may include a plurality of cameras.

In an embodiment, the camera module 310 may include a first camera 311, a second camera 312, and a third camera 313. For example, the camera module 310 may include the first camera 311 having a first angle of view, the second camera 312 having a second angle of view, and the third camera 313 having a third angle of view. As another example, the first camera 311 having the first angle of view may be an Ultra-Wide (UW) camera, the second camera 312 having the second angle of view may be a Wide (W) camera, and the third camera 313 having the third angle of view may be a Tele (T) camera.

According to an embodiment, the electronic device 300 may control activation and operation (e.g., OIS, AF) of the first camera 311 included in the camera module 310, under the control of a processor 330.

According to an embodiment, the electronic device 300 may at least activate Auto Focus (AF), Auto Exposure (AE), and Auto White Balance (AWB) of different cameras other than an activated camera used for image acquisition, under the control of the processor 330.

According to an embodiment, the first camera 311 may include a barrel unit 410, a driving unit 420, and an image sensor 430. In an embodiment, the barrel unit 410 may include a lens 411, a barrel housing 412, an AF coil 413, and/or a first hall IC 414. For example, the lens 411 may be disposed inside the barrel housing 412, and the AF coil 413 and an AF magnet 421 may be disposed around the barrel housing 412. In an embodiment, the driving unit 420 may include the AF magnet 421, an OIS magnet 422, an OIS coil 423, and/or a second hall IC 424.

According to an embodiment, the electronic device 300 may control the AF coil 413 and the OIS coil 423 using the processor 330, and the AF coil 413 and the OIS coil 423 may control OIS driving and AF driving of the first camera 311, under the control of the processor 330.

According to an embodiment, it is understood that within the structure of the first camera 311, dispositions of coils (e.g., the AF coil 413, the OIS magnet 422) is not be limited to the description set forth above. Other variations are contemplated within the scope of this disclosure.

As described above, descriptions related to the structure of the first camera 311 and the operation in which the processor 330 of the electronic device 300 controls driving (e.g., OIS, AF) of the first camera 311 may also be applied equally or similarly to the structures of the second camera 312 and third camera 313 and the operation in which the processor 330 controls driving (e.g., OIS, AF) of the second camera 312 and/or third camera 313.

According to an embodiment, the processor 330 of the electronic device 300 may control a distance between the first camera 311, the second camera 312, and the third camera 313 included in the camera module 310. For example, there may be a change in the distance between the cameras (e.g., the first camera 311, the second camera 312, and the third camera 313) during a series of operations in which the active camera used for capturing images is switched, and the processor 330 of the electronic device 300 may control the distance between the cameras (e.g., the first camera 311, the second camera 312, and the third camera 313). Detailed descriptions thereof will be described below.

Figure 5:
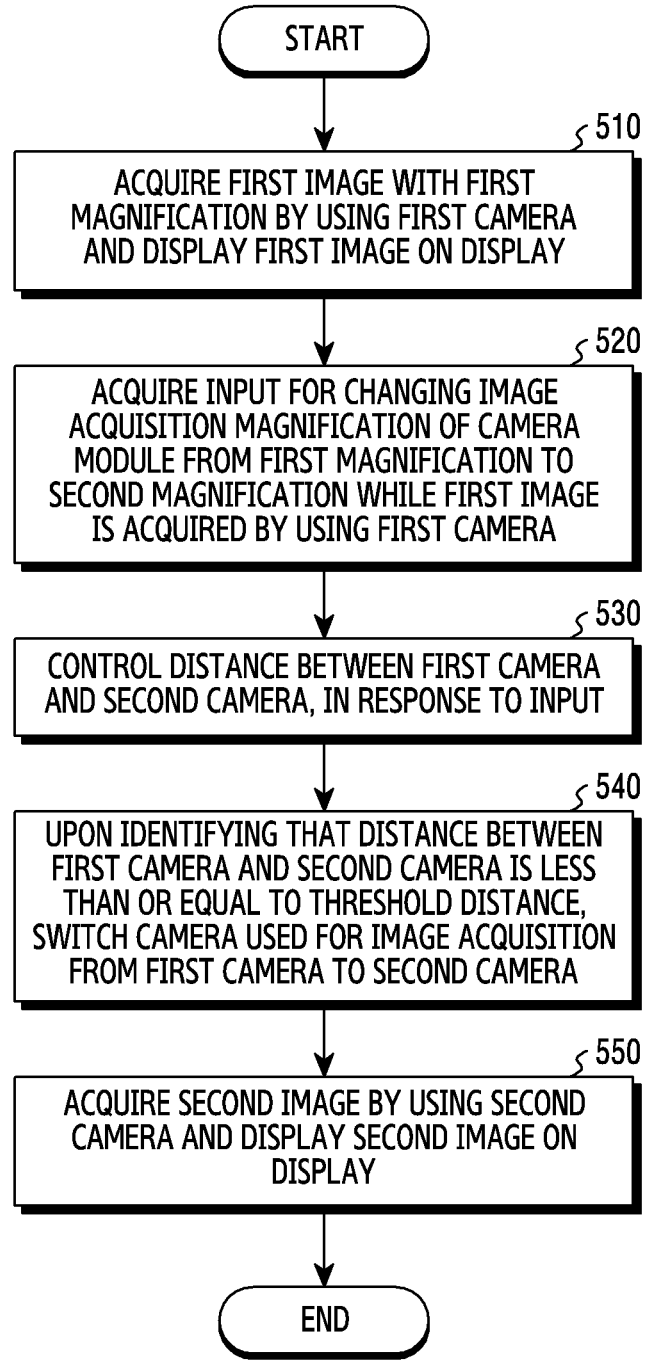
FIG. 5 is a flowchart illustrating an overall flow of switching a camera in an electronic device, according to an embodiment.

FIG. 5 is a flowchart illustrating an overall flow of switching a camera in an electronic device, according to an embodiment.

Figure 6:
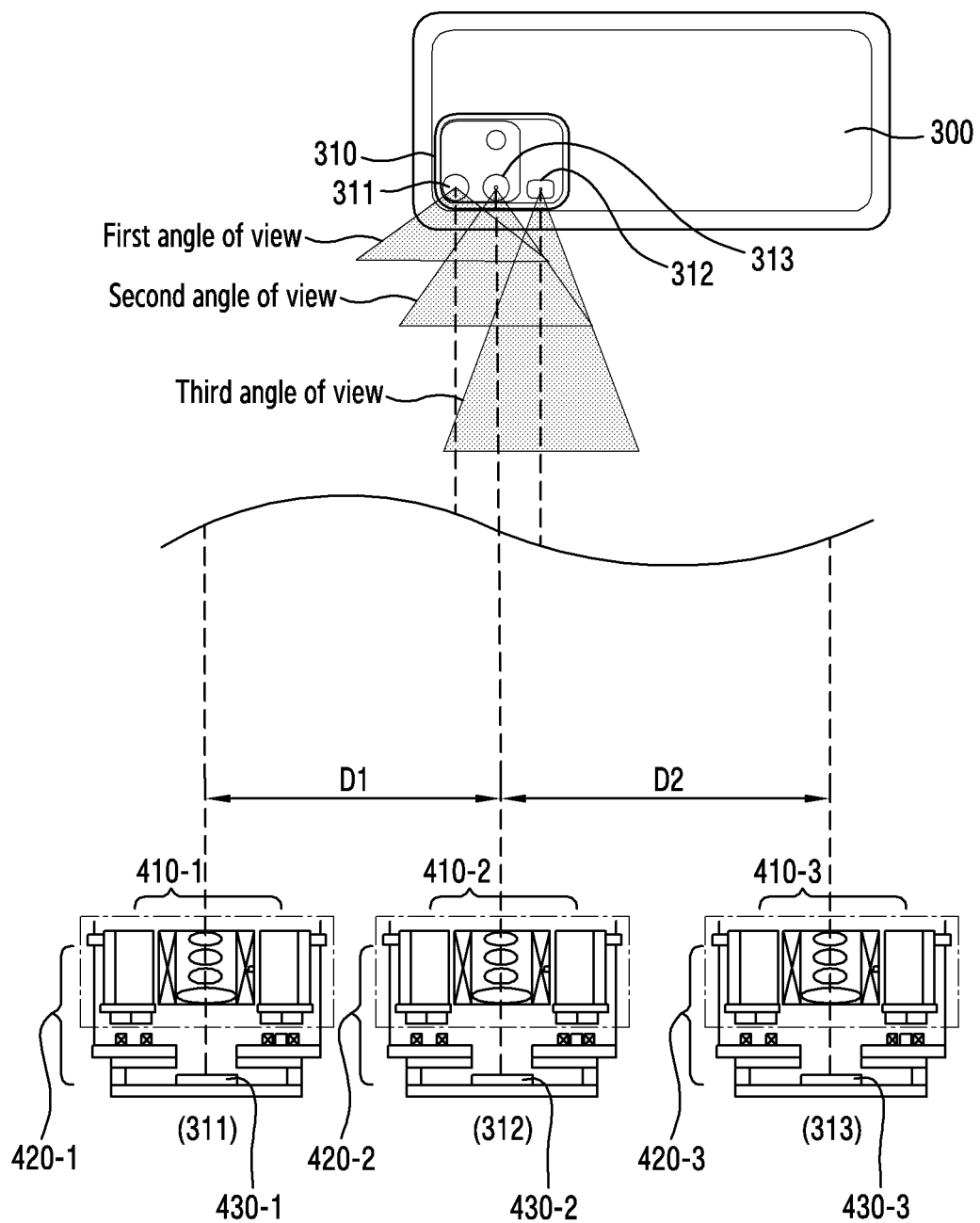
FIG. 6 illustrates physical locations of cameras having different angles of view in an electronic device, according to an embodiment.

Descriptions on the overall flow of switching the camera in the electronic device according to FIG. 5 will be described with reference to FIG. 6 illustrating an embodiment regarding physical locations of cameras having different angles of view in the electronic device.

In an embodiment, referring to FIG. 6, a first camera 311 may have a first angle of view, a second camera 312 may have a second angle of view, and a third camera 313 may have a third angle of view. The first angle of view may be an angle of view corresponding to an angle of view of a UW camera, the second angle of view may be an angle of view corresponding to a W camera, and the third angle of view may be an angle of view corresponding to an angle of view of a T camera.

In an embodiment, referring to FIG. 6, a default distance between the first camera 311 and the second camera 312 may be D1, and a default distance between the second camera 312 and the third camera 313 may be D2. The default distance may be a distance when the cameras do not move from their original locations (e.g., a center of a driving shaft of the camera). In another embodiment, the default distance may be a distance between a center of each of image sensors 430-1, 430-2, and 430-3. For example, a default distance between the first image sensor 430-1 and the second image sensor 430-2 may be D1, and a default distance between the second image sensor 430-2 and the third image sensor 430-3 may be D2.

In an embodiment, the first camera 311 may include a barrel unit 410-1, a driving unit 420-1, and an image sensor 430-1. In an embodiment, the second camera 312 may include a barrel unit 410-2, a driving unit 420-2, and the image sensor 430-2. In an embodiment, the third camera 313 may include a barrel unit 410-3, a driving unit 420-3, and the image sensor 430-3.

In an embodiment, the barrel unit (e.g., 410-1, 410-2, 410-3) may include a lens (e.g., the lens 411), a barrel housing (e.g., the barrel housing 412), an AF coil (e.g., the AF coil 413), and/or a hall IC (e.g., the first hall IC 414).

In an embodiment, the driving unit (e.g., 420-1, 420-2, 420-3) may include an AF magnet (e.g., the AF magnet 421), an OIS magnet (e.g., the OIS magnet 422), an OIS coil (e.g., the OIS coil 423), and/or a hall IC (e.g., the second hall IC 424).

In operation 510 according to an embodiment, the electronic device 300 may acquire a first image with a first magnification by using a first camera (e.g., the first camera 311) under the control of the processor 330, and may display the first image on a display (e.g., the display 320).

In an embodiment, the electronic device 300 may acquire the first image with the first magnification by using the first camera 311, under the control of the processor 330. For example, the electronic device 300 may acquire the first image under the control of the processor 330, and the first image may be an image acquired by the electronic device 300 using the first camera 311 with a magnification of 0.5× and a first angle of view. In this case, the first angle of view may correspond to an angle of view of a UW camera.

In an embodiment, the electronic device 300 may display the first image acquired by using the first camera 311 on the display 320. For example, the electronic device 300 may display the acquired first image on the display 320 under the control of the processor 330.

In operation 520 according to an embodiment, the electronic device 300 may acquire an input for changing an image acquisition magnification of a camera module (e.g., the camera module 310) from the first magnification to a second magnification while the first image is acquired by using the first camera (e.g., the first camera 311), under the control of the processor 330.

In an embodiment, the electronic device 300 may receive the input for changing the image acquisition magnification of the camera module 310 under the control of the processor 330. For example, the electronic device 300 may receive a user's input requesting a change in the image acquisition magnification from the first magnification (e.g., 0.5×) to the second magnification (e.g., 1×), under the control of the processor 330. The user's input may be an input for further enlarging the image being acquired. The input may be received via input circuitry, such as a mechanical button, a displayed icon for touch selection, etc.

In operation 530 according to an embodiment, the electronic device 300 may change a distance between the first camera (e.g., the first camera 311) and the second camera (e.g., the second camera 312), in response to the acquisition of the input, under the control of the processor 330.

In an embodiment, the electronic device 300 may change a distance (e.g., D1) between the first camera 311 and the second camera 312, under the control of the processor 330. For example, the electronic device 300 may reduce the distance D1 between the first camera 311 and the second camera 312 under the control of the processor 330. As another example, the electronic device 300 may control a driving unit (e.g., the driving unit 420) of cameras (e.g., the first camera 311, the second camera 312) under the control of the processor 330 so that each of the first camera 311 and the second camera 312 moves. As the first camera 311 and the second camera 312 move closer together, the distance D1 is reduced. Specifically, for example, the electronic device 300 may control the first camera 311 to move in a direction towards the second camera 312 under the control of the processor 330. The second camera 312 may also move in a direction towards the first camera 311.

In an embodiment, the electronic device 300 may change a direction and/or strength of current which flows in the OIS coil 423, thereby adjusting the distance D1 of the cameras (e.g., the first camera 311, the second camera 312).

In operation 540 according to an embodiment, upon detecting that the distance between the first camera (e.g., the first camera 311) and the second camera (e.g., the second camera 312) is less than or equal to a threshold distance, the electronic device 300 may switch the operational camera used for image acquisition from the first camera (e.g., the first camera 311) to the second camera (e.g., the second camera) 312, under the control of the processor 330

In an embodiment, the electronic device 300 may detect (or determine) a distance between the first camera 311 and the second camera 312 under the control of the processor 330. For example, the electronic device 300 may identify and/or monitor a real-time distance between the first camera 311 and the second camera 312 under the control of the processor 330. As another example, the electronic device 300 may identify whether the distance between the first camera 311 and the second camera 312 is less than or equal to a threshold distance (e.g., D3 of FIG. 8) under the control of the processor 330.

In an embodiment, the electronic device 300 may identify the real-time distance between the first camera 311 and the second camera 312 under the control of the processor 330. If it is identified that the distance identified by the electronic device 300 is less than or equal to the threshold distance (e.g., D3 of FIG. 8), the operational camera used for image acquisition may be switched from the first camera 311 to the second camera 312.

In operation 550 according to an embodiment, the electronic device 300 may acquire a second image by using the second camera (e.g., the second camera 312) and may display the second image on the display (e.g., the display 320), under the control of the processor 330.

In an embodiment, the electronic device 300 may acquire the second image with the second magnification by using the second camera 312, under the control of the processor 330. For example, the electronic device 300 may acquire the second image under the control of the processor 330, and the second image may be an image acquired by using the second camera 312 with a magnification of 1× and the second angle of view. In this case, the second angle of view may be an angle of view corresponding to an angle of view of a W camera.

In an embodiment, the electronic device 300 may display the second image acquired by using the second camera 312 on the display 320. For example, the electronic device 300 may display the acquired second image on the display 320 under the control of the processor 330.

According to the aforementioned description, the overall flow of switching process within the electronic device 300 has been provided in terms of illustrating a switch from the first camera 311 and the second camera 312 However, the same description is also applicable for switching between the second camera 312 and the third camera 313. Accordingly, a description of operations 510 to 550 can be adapted to a process for switching between the second camera 312 and the third camera 313, which will now be described.

In an operation corresponding to operation 510, according to an embodiment, the electronic device 300 may acquire the second image with the second magnification by using the second camera (e.g., the second camera 312) under the control of the processor 330, and may display the second image on the display (e.g., the display 320).

In an embodiment, the electronic device 300 may acquire the second image with the second magnification by using the second camera 312, under the control of the processor 330. For example, the electronic device 300 may acquire the second image under the control of the processor 330, and the second image may be an image acquired by the electronic device 300 by using the second camera 312 with the magnification of 1× and the second angle of view. In this case, the second angle of view may be an angle of view corresponding to an angle of view of a W camera.

In an embodiment, the electronic device 300 may display the second image acquired by using the second camera 312 on the display 320. For example, the electronic device 300 may display the acquired second image on the display 320 under the control of the processor 330.

In an operation corresponding to operation 520 according to an embodiment, the electronic device 300 may receive an input requesting changing an image acquisition magnification of a camera module (e.g., the camera module 310) from the second magnification to a third magnification while the second image is acquired by using the second camera (e.g., the second camera 312), under the control of the processor 330.

In an embodiment, the electronic device 300 may receive the input requesting changing the image acquisition magnification of the camera module 310 under the control of the processor 330. For example, the electronic device 300 may receive a user's input requesting changing the image acquisition magnification from the second magnification (e.g., 1×) to the third magnification (e.g., 5×), under the control of the processor 330. The user's input may further enlarge the image being acquired (e.g., a zoom-in operation on an image preview screen).

In an operation corresponding to operation 530 according to an embodiment, the electronic device 300 may control a distance between a second camera (e.g., the second camera 312) and a third camera (e.g., the third camera 313), in response to the acquisition of the input, under the control of the processor 330.

In an embodiment, the electronic device 300 may control a distance (e.g., D2) between the second camera 312 and the third camera 313, under the control of the processor 330. For example, the electronic device 300 may reduce the distance D2 between the second camera 312 and the third camera 313 under the control of the processor 330. As another example, the electronic device 300 may control a driving unit (e.g., the driving unit 420) of cameras (e.g., the second camera 312, the third camera 313) under the control of the processor 330 so that each of the second camera 312 and the third camera 313 is moved. As the second camera 312 and the third camera 313 get closer in distance, the distance D2 may be reduced. Specifically, for example, the electronic device 300 may cause the second camera 312 to move in a direction towards the third camera 313 under the control of the processor 330. The third camera 313 may also move in a direction towards the second camera 312.

In an operation corresponding to operation 540 according to an embodiment, upon identifying that the distance between the second camera (e.g., the second camera 312) and the third camera (e.g., the third camera 313) is less than or equal to a threshold distance, the electronic device 300 may switch a camera used for image acquisition from the second camera (e.g., the second camera 312) to the third camera (e.g., the third camera 313), under the control of the processor 330

In an embodiment, the electronic device 300 may identify (or determine) a distance between the second camera 312 and the third camera 313 under the control of the processor 330. For example, the electronic device 300 may monitor a real-time distance between the second camera 312 and the third camera 313 under the control of the processor 330. As another example, the electronic device 300 may identify whether the distance between the second camera 312 and the third camera 313 is less than or equal to a threshold distance (e.g., D4 of FIG. 8) under the control of the processor 330.

In an embodiment, the electronic device 300 may identify the real-time distance between the second camera 312 and the third camera 313 under the control of the processor 330. If it is identified that the distance identified by the electronic device 300 is less than or equal to the threshold distance (e.g., D4 of FIG. 8), an operational camera used for image acquisition may be switched from the second camera 312 to the third camera 313.

In an operation corresponding to operation 550 according to an embodiment, the electronic device 300 may acquire a third image using the third camera (e.g., the third camera 313) under the control of the processor 330, and may display the third image on the display (e.g., the display 320).

In an embodiment, the electronic device 300 may acquire the third image with the third magnification using the third camera 313, under the control of the processor 330. For example, the electronic device 300 may acquire the third image under the control of the processor 330, and the third image may be an image acquired by using the third camera 312 with a magnification of 5× and a third angle of view. In this case, the third angle of view may be an angle of view corresponding to an angle of view of a T camera.

In an embodiment, the electronic device 300 may display the third image acquired by using the third camera 313 on the display 320. For example, the electronic device 300 may display the acquired third image on the display 320 under the control of the processor 330.

In the operations 510 to 550 of FIG. 5, an embodiment of increasing the image acquisition magnification of the camera module 310, such as changing from the first magnification (e.g., 0.5×) to the second magnification (e.g., 1×) or changing from the second magnification (e.g., 1×) to the third magnification (e.g., 5×) has been mainly described. However, the description on the operations 510 to 550 related to camera switching may also be applied to an embodiment of decreasing the image acquisition magnification of the camera module, such as changing from the third magnification (e.g., 5×) to the second magnification (e.g., 1×) or changing from the second magnification (e.g., 1×) to the first magnification (e.g., 0.5×), which has also been described above.

According to certain embodiments, the listed magnifications (e.g., 0.5×, 1×, 5×) in the embodiments above are described as are criteria for camera switching by way of example, and it should be understood that the disclosure is not limited to the specified magnifications described in the examples above.

Figure 7:
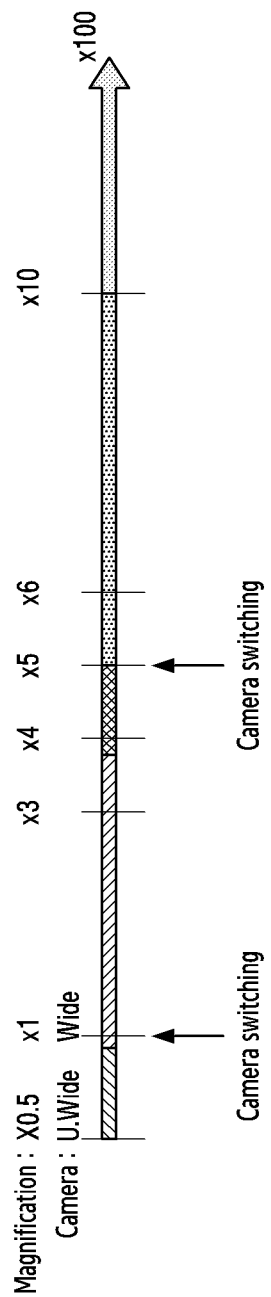
FIG. 7 illustrates a timing at which a camera is switched in a zoom scenario of an electronic device, according to an embodiment.

FIG. 7 illustrates an embodiment of an example timing at which a camera is switched in a zoom scenario of an electronic device.

In an embodiment, referring to FIG. 7, from a magnification of 0.5× up to a magnification of 1×, a UW camera, i.e., the first camera (e.g., the first camera 311), may be used for image acquisition. From the magnification of 1× up to a magnification of 5×, a W camera, i.e., second camera (e.g., the second camera 312), may be used in image acquisition.

From the magnification of 5× up to a magnification of 100×, a third camera (e.g., the third camera 313) may be used for image acquisition.

In an embodiment, referring to FIG. 7, the electronic device 300 may change the image acquisition magnification of the camera module 310 from 0.5× up to 100×, based on a user input for changing the image acquisition magnification.

In an embodiment, upon receiving the input requesting changing the image acquisition magnification of the camera module 310 from a first magnification (e.g., 0.5×) to a second magnification (e.g., 1×) under the control of the processor 330, as performed in the operation 530, the electronic device 300 may move both the first camera 311 and the second camera 312 under the control of the processor 330. By moving both the first camera 311 and the second camera 312, a distance between the first camera 311 and the second camera 312 may be reduced. Upon identifying that the distance is less than or equal to a threshold distance, the electronic device 300 may switch the operational camera under the control of the processor 330. The electronic device 300 may switch the operational camera used for image acquisition from the first camera 311 to the second camera 312, and may acquire an image by using the second camera 312.

In an embodiment, upon acquiring an input requesting changing the image acquisition magnification of the camera module 310 from the second magnification (e.g., 1×) to a third magnification (e.g., 5×) under the control of the processor 330, as performed in the operation 530, the electronic device 300 may move both the second camera 312 and the third camera 313 under the control of the processor 330. By moving both the second camera 312 and the third camera 313, a distance between the second camera 312 and the third camera 313 may be reduced. Upon identifying that the distance is less than or equal to a threshold distance, the electronic device 300 may perform switching of the operational camera under the control of the processor 330. The electronic device 300 may switch a camera used for image acquisition from the second camera 312 to the third camera 313, and may acquire an image by using the third camera 313.

In certain embodiments, the magnifications of 0.5×, 1× and 100× are only an example, and the disclosure is not limited thereto. In addition, regarding a type of a camera used for image acquisition, there is no need to use one camera in each of the ranges from 0.5× to 1×, from 1× to 5×, and from 5× to 100×, and there may be a mixed, overlapping ranges as well. According to certain embodiments, magnifications (e.g., 0.5×, 1×, 5×) which are criteria for camera switching may be an example, and are not limited to the magnifications described above.

Figure 8:
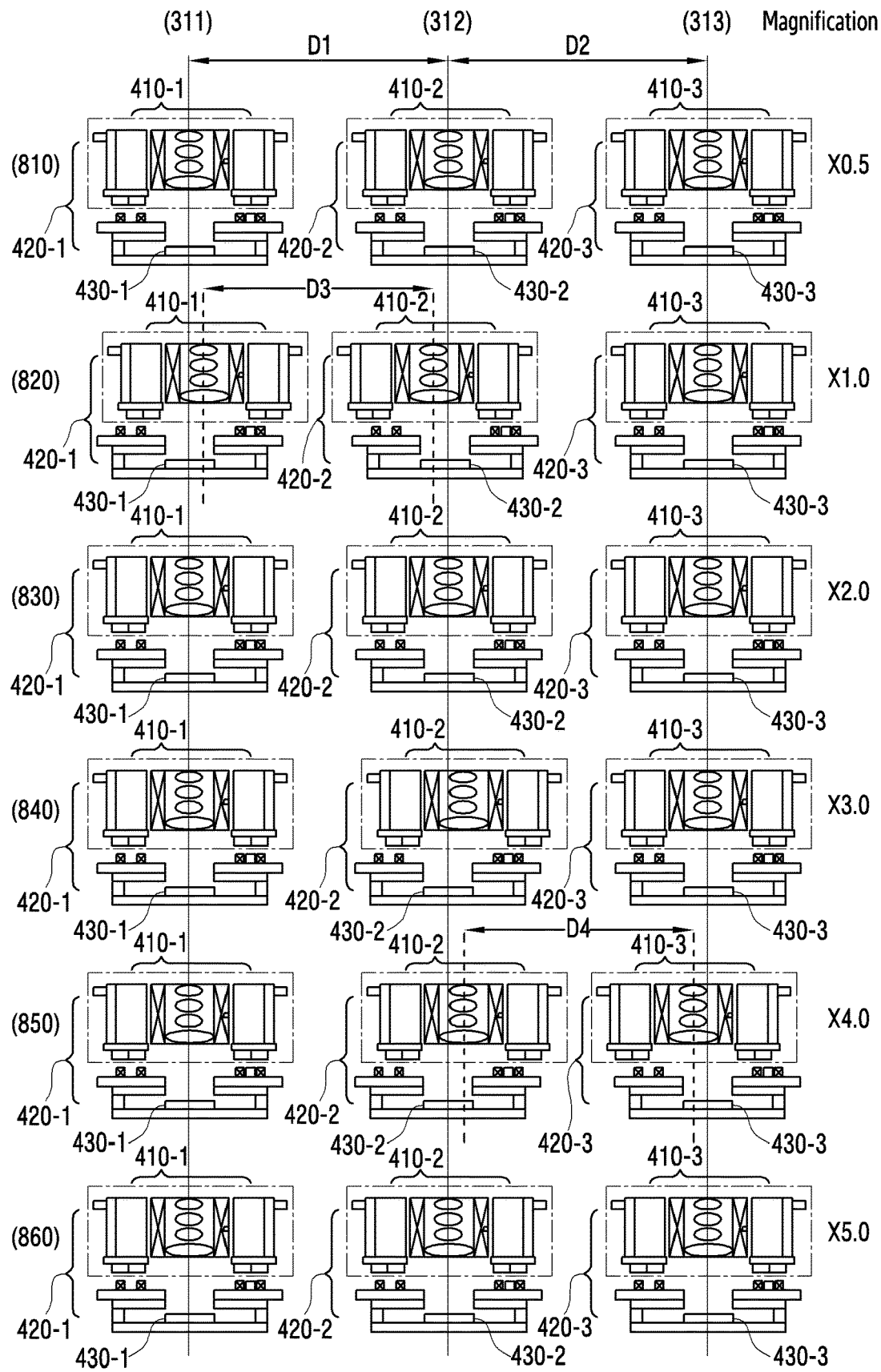
FIG. 8 illustrates controlling of a distance between cameras in a zoom scenario of an electronic device, according to an embodiment.

FIG. 8 illustrates examples of controlling of a distance between cameras in a zoom scenario of an electronic device, according to an embodiment. The controlling of the distance between the cameras in the zoom scenario will be described with reference to operations 810 to 860 indicating a location state of the cameras.

According to an embodiment, the electronic device 300 may control a distance between cameras (e.g., the first camera 311, the second camera 312, and the third camera 313) in the zoom scenario under the control of the processor 330. For example, the electronic device 300 may control a driving unit (e.g., the driving unit 420) by using the processor 330, thereby controlling the distance between the first camera 311, the second camera 312, and the third camera 313

According to an embodiment, a default distance between the first camera 311 and the second camera 312 may be D1, and a default distance between the second camera 312 and the third camera 313 may be D2. The default distance may be a distance when the cameras are not moved from their original positions (e.g., as determined from a center of a driving shaft of the camera).

According to an embodiment, the image acquisition magnification of the camera module 310 may be 0.5× in operation 810. The image acquisition magnification of the camera module 310 may be 1× in operation 820. The image acquisition magnification of the camera module 310 may be 2× in operation 830. The image acquisition magnification of the camera module 310 may be 3× in operation 840. The image acquisition magnification of the camera module 310 may be 4× in operation 850. The image acquisition magnification of the camera module 310 may be 5× in operation 860. The image acquisition magnification of the camera module 310 may be a magnification adjusted by the electronic device 300 which acquires a user's input for a magnification change (e.g., zoom in, zoom out) under the control of the processor 330.

In operation 810 according to an embodiment, the electronic device 300 may acquire a first image under the control of the processor 330 by using the first camera 311. In this case, the distance between the first camera 311 and the second camera 312 may be D2, and the distance between the second camera 312 and the third camera 313 may be D2.

In an embodiment, the electronic device 300 may acquire a user's input for changing the image acquisition magnification to a second magnification (e.g., 2×) while acquiring the first image with a first angle of view (e.g., an ultra-wide angle) and a first magnification (e.g., 0.5×) under the control of the processor 330.

In an embodiment, the electronic device 300 may drive each of the first camera 311 and the second camera 312 under the control of the processor 330 to reduce the distance between the first camera 311 and the second camera 312.

In operation 820 according to an embodiment, the electronic device 300 may identify whether the distance between the first camera 311 and the second camera 312 is less than or equal to a threshold distance (e.g., D3), under the control of the processor 330.

In operation 830 according to an embodiment, upon identifying that the distance between the first camera 311 and the second camera 312 is less than or equal to a threshold distance (e.g., D3), the electronic device 300 may switch the operational camera used for image acquisition to the second camera 312, under the control of the processor 330. Upon switching the camera used for image acquisition to the second camera 312, the electronic device 300 may restore the first camera 311 and second camera 312 to their original positions (e.g., relative to a center of a driving shaft of the camera) under the control of the processor 330. In this case, the distance between the first camera 311 and the second camera 312 may be reset to D1, and the distance between the second camera 312 and the third camera 313 may be reset to D2.

In an embodiment, the electronic device 300 may acquire a second image with a second angle of view (e.g., wide angle) and the second magnification (e.g., 2×) under the control of the processor 330.

In an embodiment, the electronic device 300 may receive a user's input requesting changing the image acquisition magnification to a third magnification (e.g., 5×) while acquiring the second image with the second angle of view (e.g., wide angle) and the second magnification (e.g., 2×) under the control of the processor 330.

In operation 840 according to an embodiment, the electronic device 300 may drive each of the second camera 312 and the third camera 313 under the control of the processor 330 to reduce the distance between the second camera 312 and the third camera 313.

In operation 850 according to an embodiment, the electronic device 300 may identify whether the distance between the second camera 312 and the third camera 313 is less than or equal to a threshold distance (e.g., D4), under the control of the processor 330.

In operation 860 according to an embodiment, upon identifying that the distance between the second camera 312 and the third camera 313 is less than or equal to a threshold distance (e.g., D4), the electronic device 300 may switch the camera used for image acquisition to the third camera 313, under the control of the processor 330. After switching the camera used for image acquisition to the third camera 313, and after capturing the image, the electronic device 300 may restore the second camera 312 and third camera 313 to their original positions (e.g., relative to a center of a driving shaft of the camera) under the control of the processor 330. In this case, the distance between the first camera 311 and the second camera 312 may be reset to D1, and the distance between the second camera 312 and the third camera 313 may be reset to D2.

Figure 9:
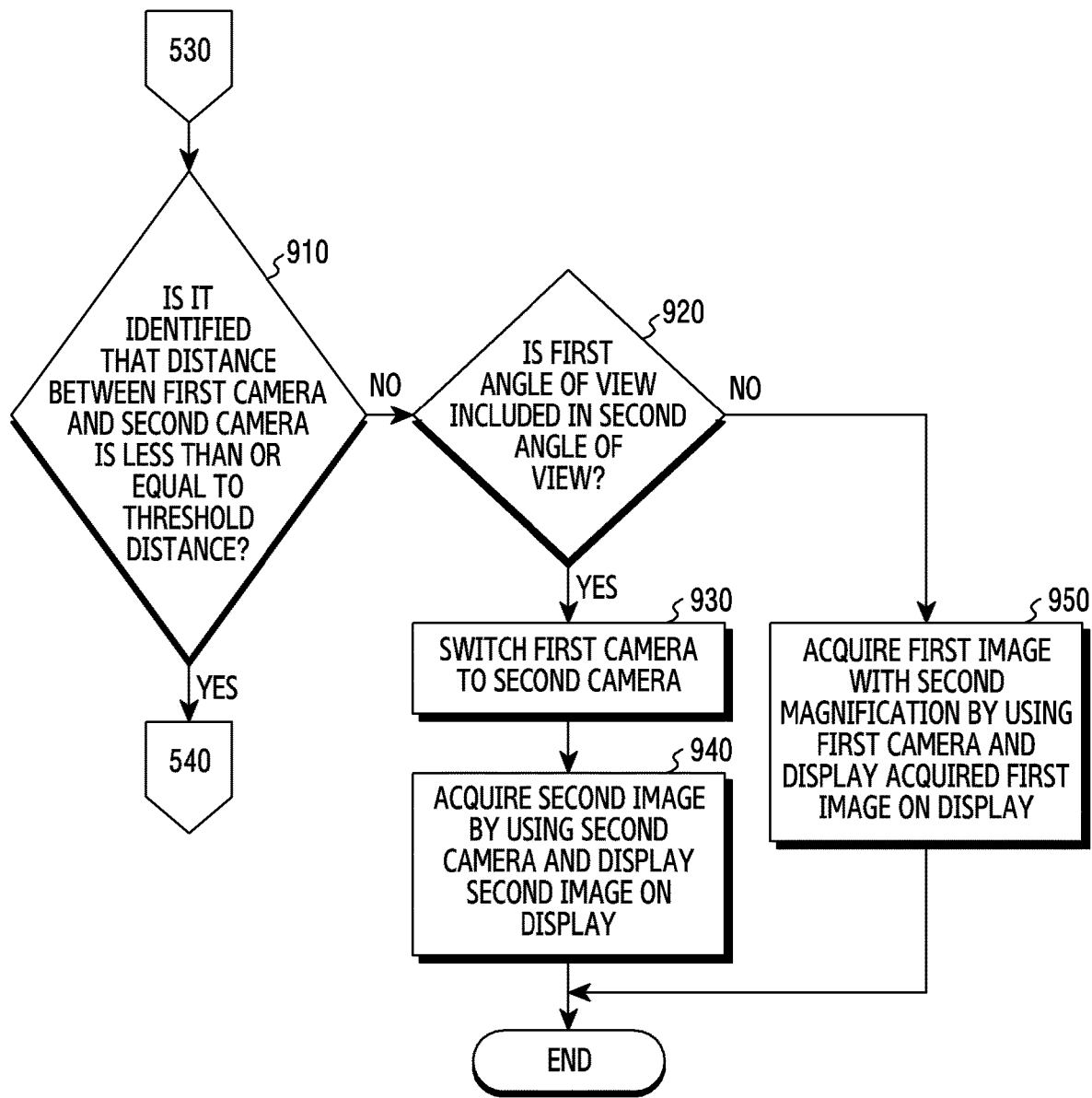
FIG. 9 is a flowchart illustrating switching of a camera, based on an angle of view, in an electronic device, according to an embodiment.

FIG. 9 is a flowchart illustrating switching of a camera, based on an angle of view, in an electronic device, according to an embodiment. The description of the flowchart of FIG. 9 will be described with reference to FIG. 10 and FIG. 11 indicating first and second embodiments for switching a camera, based on an angle of view, in an electronic device.

Figure 10:
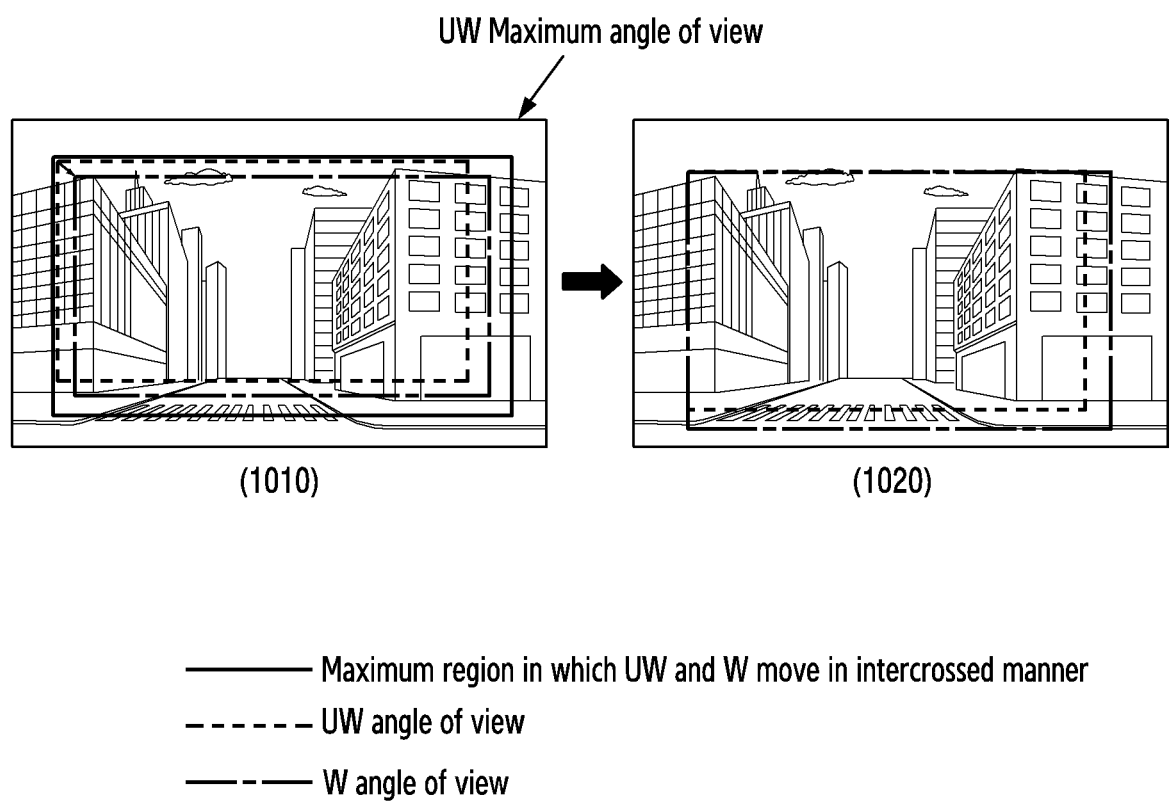
FIG. 10 illustrates a first embodiment for switching a camera, based on an angle of view, in an electronic device.
Figure 11:
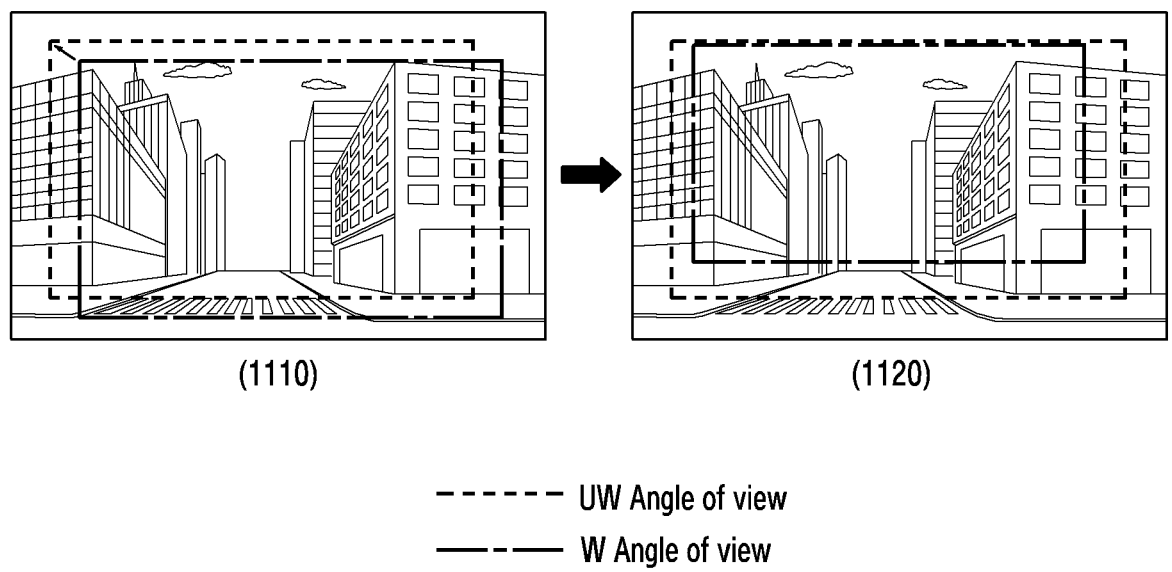
FIG. 11 illustrates a second embodiment for switching a camera, based on an angle of view, in an electronic device.

Referring to FIGS. 9 and 10, in operation 910 according to an embodiment, the electronic device 300 may identify whether a distance between a first camera (e.g., the first camera 311) and a second camera (e.g., the second camera 312) is less than or equal to a threshold distance, under the control of the processor 330.

In an embodiment, upon identifying that the distance between the first camera (e.g., the first camera 311) and the second camera (e.g., the second camera 312) is less than or equal to the threshold distance, the electronic device 300 may perform operation 540 (e.g., the operation 540 of FIG. 5). For example, upon identifying that the distance between the first camera (e.g., the first camera 311) and the second camera (e.g., the second camera 312) is less than or equal to the threshold distance, the electronic device 300 may switch an operational camera used for image acquisition from the first camera (e.g., the first camera 311) to the second camera (e.g., the second camera 312), under the control of the processor 330. The electronic device 300 may acquire a second image with a second angle of view and a second magnification by using the switched second camera (e.g., the second camera 312), under the control of the processor 330.

In an embodiment, upon identifying that the distance between the first camera (e.g., the first camera 311) and the second camera (e.g., the second camera 312) is not less than nor equal to the threshold distance, the electronic device 303 may perform operation 920.

In operation 920 according to an embodiment, the electronic device 300 may determine whether a first angle of view of the first camera 311 is included in the second angle of view of the second camera 312, under the control of the processor 330.

According to an embodiment, the electronic device 300 may at least activate AF, AE, and AWB of different cameras (e.g., the second camera 312, the third camera 313) other than an activated camera (e.g., the first camera 311) used in image acquisition, under the control of the processor 330.

In an embodiment, referring to 1010, the electronic device 300 may be in the process of acquiring an image with the first angle of view using the first camera 311 under the control of the processor 330. The electronic device 300 may receive a user's input requesting changing the image acquisition magnification while receiving an image with a first angle of view and a first magnification by using the first camera 311, under the control of the processor 330.

In an embodiment, referring to 1020, while acquiring the user's input for changing the image acquisition magnification to the second magnification, the electronic device 300 may estimate an angle of view (e.g., the second angle of view) of the second camera 312, based on the activated AF, AE, and AWB of the second camera 312. The electronic device 300 may identify whether a range of the angle of view (e.g., the first angle of view) with which image acquisition is being performed (e.g., by the first camera 311) is included in a range of the estimated angle of view (e.g., the second angle of view of the second camera 312).

In an embodiment, upon identifying that that the first angle of view is included in the second angle of view, the electronic device 300 may perform operation 930. For example, upon identifying that the range of the angle of view (e.g., the first angle of view) is included in the range of the estimated angle of vies (e.g., the second angle of view), the electronic device 300 may perform operation 930 related to camera switching, under the control of the processor 330.

That is, in operation 930 according to an embodiment, the electronic device 300 may switch the first camera (e.g., the first camera 311) to the second camera (e.g., the second camera 312), under the control of the processor 330. Upon identifying that the range of the angle of view (e.g., the first angle of view) with which image acquisition is being performed is included in the range of the estimated angle of view (e.g., the second angle of view), the electronic device 300 may switch the camera used for image acquisition from the first camera 311 to the second camera 312, under the control of the processor 330.

In operation 940 according to an embodiment, the electronic device 300 may acquire the second image by using the second camera (e.g., the second camera 312), and may display the second image on the display 320. For example, the electronic device 300 may acquire the second image with the second angle of view and the second magnification by using the switched camera, i.e., the second camera 312, under the control of the processor 330.

In an embodiment, upon identifying that the first angle of view is not included in the second angle of view, the electronic device 300 may perform operation 950. For example, upon identifying that a range of an angle of view (e.g., the first angle of view of the first camera 311) with which image acquisition is being performed is not included in an estimated angle of view (e.g., the second angle of view of the second camera 312), the electronic device 300 may perform operation 950 in which the camera is not switched and operation of the first camera 311 is maintained, under the control of the processor 330.

In operation 950 according to an embodiment, the electronic device 300 may acquire the first image with the second magnification using the first camera (e.g., the first camera 311), and may display the first image on the display 320. For example, the electronic device 300 may acquire the first image with the first angle of view and the changed magnification, i.e., the second magnification, by using the first camera 311, without switching operation to the second camera.

As described above, upon changing from the first angle of view (e.g., ultra-wide angle) to the second angle of view (e.g., wide angle), the electronic device 300 may perform the operations 910 to 950. However, the aforementioned description on the operations 910 to 950 may equally apply not only to a case of changing from the first angle of view (e.g., ultra-wide angle) to the second angle of view (e.g., wide angle), but also to a case of changing from the second angle of view (e.g., wide angle) to the first angle of view (e.g., ultra-wide angle) similarly to a second embodiment of FIG. 11 in which a camera is switched based on an angle of view in an electronic device.

According to the aforementioned description, although switching an overall flow of switching cameras in the electronic device (e.g., the electronic device 300) is described with reference to operations between the first camera 311 and the second camera 312, the same or similar description is also applicable to switching between the second camera 312 and the third camera 313.

The description for the operation in which the second camera 312 and the third camera 313 are switched based on the angle of view in the electronic device 300 will be described with reference to FIG. 12 and FIG. 13, indicating third and fourth embodiments for switching the cameras, based on the angle of view, in the electronic device.

Figure 12:
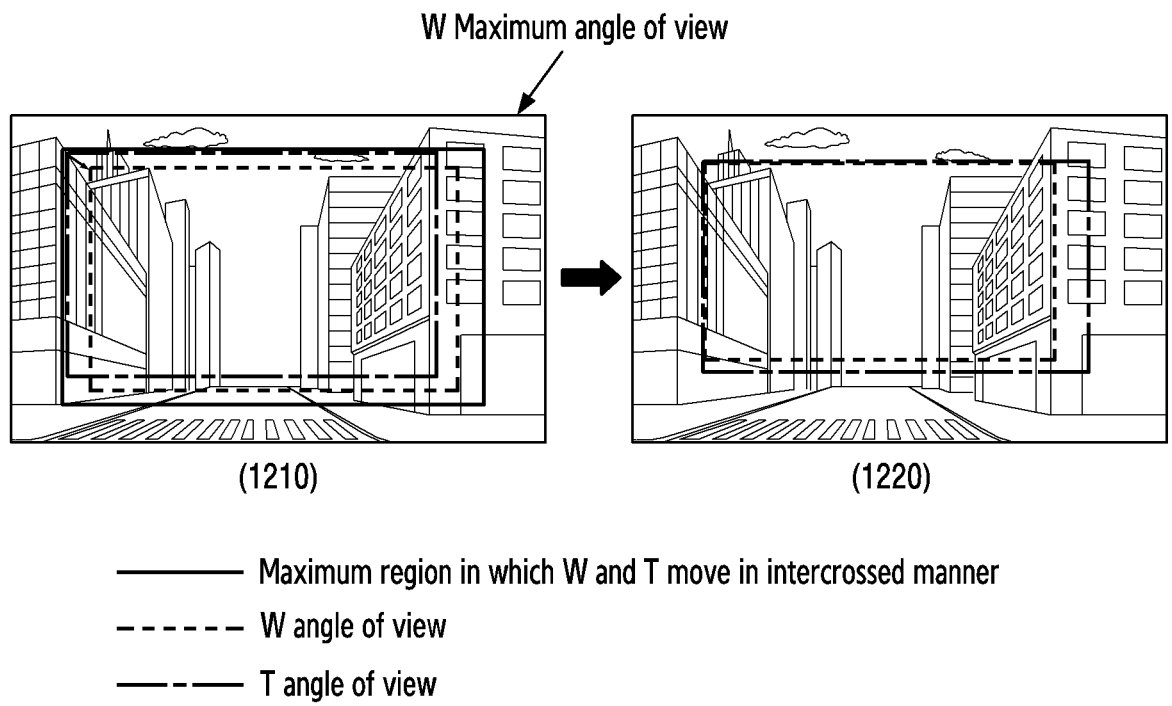
FIG. 12 illustrates a third embodiment for switching a cameras, based on an angle of view, in an electronic device.
Figure 13:
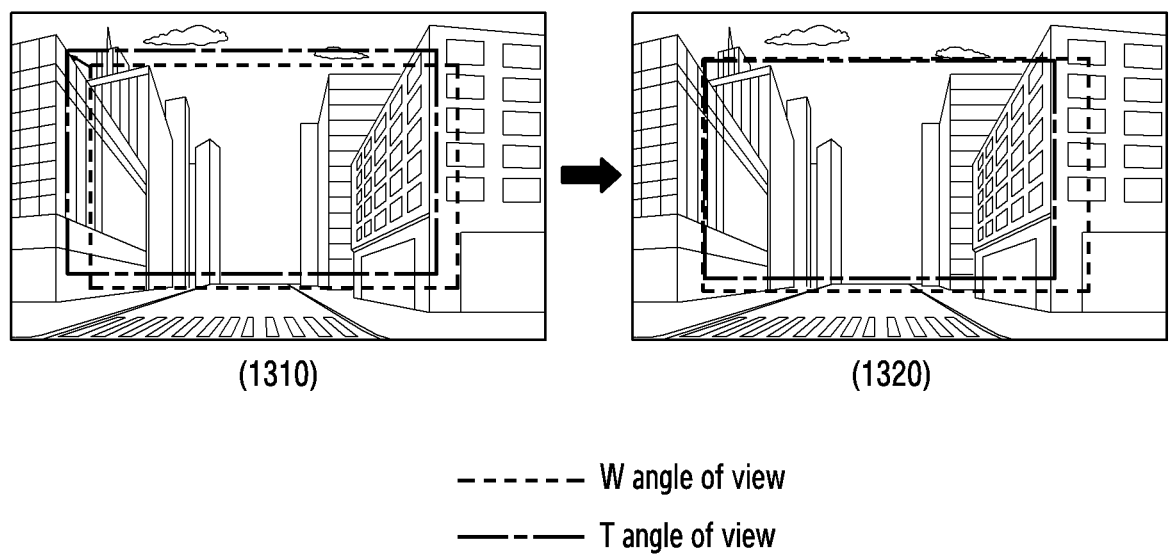
FIG. 13 illustrates a fourth embodiment for switching a camera, based on an angle of view, in an electronic device.

Referring to FIG. 12, in an operation corresponding to operation 910 according to an embodiment, the electronic device 300 may identify whether a distance between a second camera (e.g., the second camera 312) and a third camera (e.g., the third camera 313) is less than or equal to a threshold distance, under the control of the processor 330. In an embodiment, upon identifying that the distance between the second camera (e.g., the second camera 312) and the third camera (e.g., the third camera 313) is less than or equal to the threshold distance, the electronic device 303 may perform operation 540. For example, upon identifying that the distance between the second camera (e.g., the second camera 312) and the third camera (e.g., the third camera 313) is less than or equal to the threshold distance, the electronic device 300 may switch an operational camera used for image acquisition from the second camera (e.g., the second camera 312) to the third camera (e.g., the third camera 313), under the control of the processor 330. The electronic device 300 may acquire a third image with a third angle of view and a third magnification by using the switched third camera (e.g., the third camera 313), under the control of the processor 330.

In an embodiment, upon identifying that the distance between the second camera (e.g., the second camera 312) and the third camera (e.g., the third camera 313) is not less than nor equal to the threshold distance, the electronic device 303 may perform operation 920.

In an operation corresponding to operation 920 according to an embodiment, the electronic device 300 may identify whether the second angle of view of the second camera 312 is included in the third angle of view of the third camera 313, under the control of the processor 330.

According to an embodiment, the electronic device 300 may at least activate AF, AE, and AWB of different cameras (e.g., the first camera 311, the third camera 313) other than a present activated and operational camera (e.g., the second camera 312) used for image acquisition, under the control of the processor 330.

In an embodiment, referring to 1210, the electronic device 300 may be in the process of acquiring an image with the second angle of view using the second camera 312 under the control of the processor 330. The electronic device 300 may receive a user's input requesting changing the image acquisition magnification while obtaining an image with the second angle of view and the second magnification by using the second camera 312 (e.g., as a preview image), under the control of the processor 330.

In an embodiment, referring to 1220, while acquiring the user's input requesting changing the image acquisition magnification to the third magnification, the electronic device 300 may estimate an angle of view (e.g., the third angle of view) of the third camera 313, based on the activated AF, AE, and AWB of the third camera 312. The electronic device 300 may identify whether a range of the angle of view (e.g., the second angle of view of the second camera 312) with which image acquisition is performed is included in a range of the estimated angle of view (e.g., the third angle of view of the third camera 313).

In an embodiment, upon identifying that the second angle of view is included in the third angle of view, the electronic device 300 may perform operation 930. For example, upon identifying that the range of the angle of view (e.g., the second angle of view) is included in the range of the estimated angle of vies (e.g., the third angle of view), the electronic device 300 may perform operation 930 related to camera switching, under the control of the processor 330.

That is, in an operation corresponding to operation 930 according to an embodiment, the electronic device 300 may switch the operational camera from the second camera (e.g., the second camera 312) to the third camera (e.g., the third camera 313), under the control of the processor 330. Upon identifying that the range of the angle of view (e.g., the second angle of view) with which image acquisition is being performed is included in the range of the estimated angle of view (e.g., the third angle of view), the electronic device 300 may switch the camera used for image acquisition from the second camera 312 to the third camera 313, under the control of the processor 330.

In an operation corresponding to operation 940 according to an embodiment, the electronic device 300 may acquire a third image by using the third camera (e.g., the third camera 313), and may display the third image on the display 320. For example, the electronic device 300 may acquire the third image with the third angle of view and the third magnification using the switched camera, i.e., the third camera 313, under the control of the processor 330.

In an embodiment, upon identifying that the second angle of view is not included in the third angle of view, the electronic device 300 may perform operation 950. For example, upon identifying that a range of an angle of view (e.g., the second angle of view of the second camera 312) with which image acquisition is being performed is not included in an estimated angle of view (e.g., the third angle of view of the third camera 313), the electronic device 300 may perform operation 950 omitting switching of an operational camera, under the control of the processor 330.

In an operation corresponding to operation 950 according to an embodiment, the electronic device 300 may acquire the second image with the third magnification by using the second camera (e.g., the second camera 312), and may display the second image on the display 320. For example, the electronic device 300 may acquire the second image with the second angle of view and the changed magnification, i.e., the third magnification, by using the second camera 312 used previously for image acquisition, without having to switch the camera.

As described above, upon changing from the second angle of view (e.g., the wide angle) to the third angle of view (e.g., the tele angle), the electronic device 300 may perform the operations 910 to 950. However, the aforementioned description on the operations 910 to 950 may equally apply not only to a case of changing from the second angle of view (e.g., wide angle) to the third angle of view (e.g., tele angle) but also to a case of changing from the second angle of view (e.g., wide angle) to the third angle of view (e.g., tele angle) similarly to a fourth embodiment of FIG. 13 in which a camera is switched based on an angle of view in an electronic device.

An electronic device (e.g., the electronic device 300) according to an embodiment is provided. The electronic device (e.g., the electronic device 300) includes a display (e.g., the display 320), a camera module (e.g., the camera module 310) including a first camera (e.g., the first camera 311) having a first angle of view and a second camera (e.g., the second camera 312) having a second angle of view different from the first angle of view, and a processor (e.g., the processor 330) operatively coupled to the display (e.g., the display 320) and the camera module (e.g., the camera module 310). The processor (e.g., the processor 330) may be configured to acquire a first image with a first magnification by using the first camera (e.g., the first camera 311) and display the acquired first image on the display (e.g., the display 320), while acquiring the first image by using the first camera (e.g., the first camera 311), acquire an input for changing an image acquisition magnification of the camera module (e.g., the camera module 310) from the first magnification to a second magnification, control a distance between the first camera (e.g., the first camera 311) and the second camera (e.g., the second camera 312) in response to the input, upon identifying that the distance between the first camera (e.g., the first camera 311) and the second camera (e.g., the second camera 312) is less than or equal to a threshold distance, switch a camera used for image acquisition from the first camera (e.g., the first camera 311) to the second camera (e.g., the second camera 312), and acquire a second image by using the second camera (e.g., the second camera 312), and display the acquired second image on the display (e.g., the display 320).

In the electronic device (e.g., the electronic device 300) according to an embodiment, the processor (e.g., the processor 330) may be configured to control the distance between the first camera (e.g., the first camera 311) and the second camera (e.g., the second camera 312) by controlling a driving unit of the camera module (e.g., the camera module 310).

In the electronic device (e.g., the electronic device 300) according to an embodiment, the processor (e.g., the processor 330) may be configured to, in the controlling of the distance between the first camera (e.g., the first camera 311) and the second camera (e.g., the second camera 312), control the distance by moving each of the first camera (e.g., the first camera 311) and the second camera (e.g., the second camera 312).

In the electronic device (e.g., the electronic device 300) according to an embodiment, the second magnification may be less than the first magnification.

In the electronic device (e.g., the electronic device 300) according to an embodiment, the second magnification may be greater than the first magnification.

In the electronic device (e.g., the electronic device 300) according to an embodiment, the camera module (e.g., the camera module 310) may further include a third camera (e.g., the third camera 313) having a third angle of view different from the first angle of view and the second angle of view. The processor (e.g., the processor 330) may be configured to, while acquiring the second image by using the second camera (e.g., the second camera 312) and displaying the second image on the display (e.g., the display 320), acquire an input for changing the image acquisition magnification of the camera module (e.g., the camera module 310) from the second magnification to a third magnification, control a distance between the second camera (e.g., the second camera 312) and the third camera (e.g., the third camera 313) in response to the input, switch the camera used for image acquisition from the second camera (e.g., the second camera 312) to the third camera (e.g., the third camera 313) upon identifying that the distance between the second camera (e.g., the second camera 312) and the third camera (e.g., the third camera 313) is less than or equal to a threshold distance, and acquire a third image by using the third camera (e.g., the third camera 313) and display the acquired third image on the display (e.g., the display 320).

In the electronic device (e.g., the electronic device 300) according to an embodiment, the processor (e.g., the processor 330) may be configured to at least activate AF, AE, and AWB of the second camera (e.g., the second camera 312), even if the first camera (e.g., the first camera 311) is used for image acquisition.

In the electronic device (e.g., the electronic device 300) according to an embodiment, the processor (e.g., the processor 330) may be configured to, even if it is not identified that the distance between the first camera (e.g., the first camera 311) and the second camera (e.g., the second camera 312) is less than or equal to the threshold distance, switch the camera used for image acquisition from the first camera (e.g., the first camera 311) to the second camera (e.g., the second camera 312) upon identifying that the first angle of view is included in the second angle of view.

In the electronic device (e.g., the electronic device 300) according to an embodiment, the processor (e.g., the processor 330) may be configured to, if it is not identified that the first angle of view is included in the second angle of view, maintain the camera used for image acquisition to the first camera (e.g., the first camera 311).

In the electronic device (e.g., the electronic device 300) according to an embodiment, the processor (e.g., the processor 330) may be configured to acquire the first image with the second magnification by using the first camera (e.g., the first camera 311), and display the acquired first image on the display (e.g., the display 320).

A method of operating an electronic device (e.g., the electronic device 300) is provided. The method includes acquiring a first image with a first magnification by using a first camera (e.g., the first camera 311) having a first angle of view and displaying the acquired first image on a display (e.g., the display 320), while acquiring the first image by using the first camera (e.g., the first camera 311), acquiring an input for changing an image acquisition magnification of a camera module (e.g., the camera module 310) from the first magnification to a second magnification, controlling a distance between the first camera (e.g., the first camera 311) and a second camera (e.g., the second camera 312) having a second angle of view different from the first angle of view in response to the input, upon identifying that the distance between the first camera (e.g., the first camera 311) and the second camera (e.g., the second camera 312) is less than or equal to a threshold distance, switch a camera used for image acquisition from the first camera (e.g., the first camera 311) to the second camera (e.g., the second camera 312), and acquiring a second image by using the second camera (e.g., the second camera 312) and displaying acquired second image on the display (e.g., the display 320).

The method of operating the electronic device (e.g., the electronic device 300) according to an embodiment may further include controlling the distance between the first camera (e.g., the first camera 311) and the second camera (e.g., the second camera 312) by controlling a driving unit of the camera module (e.g., the camera module 310).

The method of operating the electronic device (e.g., the electronic device 300) according to an embodiment may further include, in the controlling of the distance between the first camera (e.g., the first camera 311) and the second camera (e.g., the second camera 312), controlling the distance by moving each of the first camera (e.g., the first camera 311) and the second camera (e.g., the second camera 312).

In the method of operating the electronic device (e.g., the electronic device 300) according to an embodiment, the second magnification may be less than the first magnification.

In the method of operating the electronic device (e.g., the electronic device 300) according to an embodiment, the second magnification may be greater than the first magnification.

In the method of operating the electronic device (e.g., the electronic device 300) according to an embodiment, the camera module (e.g., the camera module 310) may further include a third camera (e.g., the third camera 313) having a third angle of view different from the first angle of view and the second angle of view. The method may further include, while acquiring the second image by using the second camera (e.g., the second camera 312) and displaying the second image on the display (e.g., the display 320), acquiring an input for changing the image acquisition magnification of the camera module (e.g., the camera module 310) from the second magnification to a third magnification, controlling a distance between the second camera (e.g., the second camera 312) and the third camera (e.g., the third camera 313) in response to the input, switching the camera used for image acquisition from the second camera (e.g., the second camera 312) to the third camera (e.g., the third camera 313) upon identifying that the distance between the second camera (e.g., the second camera 312) and the third camera (e.g., the third camera 313) is less than or equal to a threshold distance, and acquiring a third image by using the third camera (e.g., the third camera 313) and displaying the acquired third image on the display (e.g., the display 320).

The method of operating the electronic device (e.g., the electronic device 300) according to an embodiment may further include at least activating AF, AE, and AWB of the second camera (e.g., the second camera 312), even if the first camera (e.g., the first camera 311) is used for image acquisition.

The method of operating the electronic device (e.g., the electronic device 300) according to an embodiment may further include, even if it is not identified that the distance between the first camera (e.g., the first camera 311) and the second camera (e.g., the second camera 312) is less than or equal to the threshold distance, switching the camera used for image acquisition from the first camera (e.g., the first camera 311) to the second camera (e.g., the second camera 312) upon identifying that the first angle of view is included in the second angle of view.

The method of operating the electronic device (e.g., the electronic device 300) according to an embodiment may further include, if it is not identified that the first angle of view is included in the second angle of view, maintaining the camera used for image acquisition to the first camera (e.g., the first camera 311).

The method of operating the electronic device (e.g., the electronic device 300) according to an embodiment may further include acquiring the first image with the second magnification by using the first camera (e.g., the first camera 311), and displaying the acquired first image on the display (e.g., the display 320).

The electronic device according to certain embodiments disclosed in the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with,"" or "connected to" another element (e.g., a second element), it means that the element may be coupled with the other element directly (e.g., wiredly), wirelessly, or via a third element.

The term "module" used in certain embodiments of the disclosure may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments of the disclosure may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the aforementioned components may include a single entity or multiple entities, and some of the plurality of entities may be separately disposed to different components. According to certain embodiments, one or more of the aforementioned components may be omitted, or one or more different components may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to certain embodiments, operations performed by the module, program, or different component may be carried out sequentially, in parallel, repeatedly, or heuristically, or one or more of the operations may be executed in a different order or omitted, or one or more different operations may be added.

What is claimed is:

1. An electronic device, comprising:
  a display;
  a camera module including a first camera having a first angle of view, and a second camera having a second angle of view different from the first angle of view; and
  a processor operatively coupled to the display and the camera module,
  wherein the processor is configured to:
  acquire a first image with a first magnification using the first camera, and display the acquired first image on the display;
  while acquiring the first image using the first camera, receive an input requesting changing an image acquisition magnification of the camera module from the first magnification to a second magnification;
  change a distance between the first camera and the second camera in response to the input;
  upon detecting that the changed distance between the first camera and the second camera is less than or equal to a threshold distance, or when the distance between the first camera and the second camera is greater than the threshold distance, that a first range of the first image is fully within an estimated second range of an estimated second image corresponding to the second angle of view, switch from the first camera to the second camera; and
  acquire a second image using the second camera, and display the acquired second image on the display.

2. The electronic device of claim 1, wherein the processor is further configured to:
  change the distance between the first camera and the second camera using a driving unit included in the camera module.

3. The electronic device of claim 1, wherein changing the distance between the first camera and the second camera further comprises moving each of the first camera and the second camera.

4. The electronic device of claim 1, wherein the second magnification is less than the first magnification.

5. The electronic device of claim 1, wherein the second magnification is greater than the first magnification.

6. The electronic device of claim 1,
  wherein the camera module further comprises a third camera having a third angle of view different from the first angle of view and the second angle of view, and
  wherein the processor is configured to:
  while acquiring the second image using the second camera, and displaying the second image on the display, receive an additional input requesting changing the image acquisition magnification of the camera module from the second magnification to a third magnification;
  change a distance between the second camera and the third camera in response to the input;
  switch the camera used for image acquisition from the second camera to the third camera upon detecting that the distance between the second camera and the third camera is less than or equal to a threshold distance; and
  acquire a third image using the third camera, and display the acquired third image on the display.

7. The electronic device of claim 1, wherein the processor is further configured to:
  activate at least Auto Focus (AF), Auto Exposure (AE), and Auto White Balance (AWB) of the second camera, when the first camera is used for image acquisition.

8. The electronic device of claim 1, wherein the processor is further configured to:
  when the first range of the first image is not fully within the estimated second range of the estimated second image, maintain activation and usage of the first camera for image acquisition.

9. The electronic device of claim 8, wherein the processor is further configured to:
  acquire the first image with the second magnification using the first camera, and display the acquired first image on the display.

10. A method of operating an electronic device, the method comprising:
  acquiring a first image with a first magnification using a first camera having a first angle of view, and displaying the acquired first image on a display;
  while acquiring the first image by using the first camera, receiving an input requesting changing an image acquisition magnification of a camera module from the first magnification to a second magnification;

changing a distance between the first camera and a second camera having a second angle of view different from the first angle of view in response to receiving the input;

upon detecting that the changed distance between the first camera and the second camera is less than or equal to a threshold distance, or when the distance between the first camera and the second camera is greater than the threshold distance, that a first range of the first image is fully within an estimated second range of an estimated second image corresponding to the second angle of view, switching from the first camera to the second camera; and acquiring a second image using the second camera, and display the acquired second image on the display.

11. The method of claim 10, further comprising:
changing the distance between the first camera and the second camera by actuating a driving unit included in the camera module.

12. The method of claim 10, further comprising:
changing the distance between the first camera and the second camera by moving each of the first camera and the second camera.

13. The method of claim 10, wherein the second magnification is less than the first magnification.

14. The method of claim 10, wherein the second magnification is greater than the first magnification.

15. The method of claim 10, wherein the camera module further comprises a third camera having a third angle of view different from the first angle of view and the second angle of view, the method further comprising:

while acquiring the second image by using the second camera and displaying the second image on the display, receiving an additional input requesting changing the image acquisition magnification of the camera module from the second magnification to a third magnification;

controlling a distance between the second camera and the third camera in response to the input;

switching the camera used for image acquisition from the second camera to the third camera upon detecting that the distance between the second camera and the third camera is less than or equal to a threshold distance; and acquiring a third image using the third camera, and displaying the acquired third image on the display.

16. The method of claim 10, further comprising activating at least Auto Focus (AF), Auto Exposure (AE), and Auto White Balance (AWB) of the second camera, when the first camera is used for image acquisition.

17. The method of claim 10, further comprising:
when the first range of the first image is not fully within the estimated second range of the second image, maintaining activation and usage of the first for image acquisition.

18. The method of claim 17, further comprising:
acquiring the first image with the second magnification using the first camera, and displaying the acquired first image on the display.

* * * * *